United States Patent [19]

Frehaut et al.

[11] Patent Number: 5,016,839
[45] Date of Patent: May 21, 1991

[54] DEVICE FOR THE LOCKING AND UNLOCKING OF TWO ELEMENTS OF A PROJECTILE, NOTABLY OF A PARACHUTE CONTAINER

[75] Inventors: Jean-Pierre Frehaut; Jean-Pierre Pineau, both of Orleans, France

[73] Assignee: Thomson-Brandt Armements, Boulogne Billancourt, France

[21] Appl. No.: 434,310

[22] Filed: Nov. 13, 1989

[30] Foreign Application Priority Data

Nov. 15, 1988 [FR] France .................. 88 14802

[51] Int. Cl.⁵ ............... F42B 10/56; F16H 21/54; F16H 25/18
[52] U.S. Cl. ............................ 244/147; 74/2; 74/99 A; 102/387; 292/256.65
[58] Field of Search .............. 292/256.63, 256.65; 102/387, 337, 339, 340; 244/147, 149; 74/2, 99 A

[56] References Cited

U.S. PATENT DOCUMENTS

| | | |
|---|---|---|
| 2,263,180 | 11/1941 | Lofgren . |
| 2,723,876 | 11/1955 | Langlois et al. ............ 102/387 |
| 3,669,304 | 6/1972 | Hansen . |
| 3,730,099 | 5/1973 | Schopp . |
| 3,834,312 | 9/1974 | Simmons . |
| 4,691,636 | 9/1987 | Witt et al. ............ 102/387 |
| 4,697,765 | 10/1987 | Wimmer . |

FOREIGN PATENT DOCUMENTS

| | | |
|---|---|---|
| 2389023 | 11/1978 | European Pat. Off. . |
| 241115 | 10/1925 | United Kingdom . |
| 8001375 | 7/1980 | World Int. Prop. O. . |

*Primary Examiner*—Galen Barefoot
*Assistant Examiner*—Virna Lissi Mojica
*Attorney, Agent, or Firm*—Oblon, Spivak, McClelland, Maier & Neustadt

[57] ABSTRACT

The disclosed device comprises, in the first element, on which the second element is mounted, a peripheral housing opened outwards, a circlip engaged in said housing, comprising teeth capable of getting engaged in retaining means of the second element, and a means to bring the ends of the circlip closer together in order to retract it and to bring out the teeth of the retaining means controlled by a delay means. The disclosed device is particularly suited to the locking and unlocking of sub-munitions parachute containers.

8 Claims, 3 Drawing Sheets

DEVICE FOR THE LOCKING AND UNLOCKING OF TWO ELEMENTS OF A PROJECTILE, NOTABLY OF A PARACHUTE CONTAINER

BACKGROUND OF THE INVENTION

1. Field of the Invention

The present invention concerns a device for the locking and unlocking of two elements of a projectile and, more particularly, a device for the unlocking and unlocking of a parachute container.

2. Description of the Prior Art

In the case of a carrier with the task of conveying and dispersing one or more decelerated sub-munitions, it is often necessary, after ejection of these sub-munitions, to delay the final deceleration indispensable to their active stage, for example in order to ensure the prior slowing down, a mutual dispersal of sub-munitions, a safety function etc.

The final deceleration is generally achieved by means of a parachute, the uncapping of which should therefore be delayed. Furthermore, it is useful for this delay to be capable of being set separately for each munition.

Approaches based on long pyrotechnical delays, used for example in tracer shells, cannot be used for two reasons:

Long pyrotechnical delays are difficult to set because of their dispersal;

In the case of multiple sub-munitions, stacked on one another, it is difficult to trigger each delay independently.

The usual approach consists in using a chronometrical system which, in the present state of the art, is preferably electronic, and only a small gas generator is kept to give the necessary energy needed to unlock the cap of the parachute.

SUMMARY OF THE INVENTION

It is an object of the invention to provide for a locking and unlocking device such as this which is particularly reliable for use in the above-mentioned conditions, is economical to make, and has other characteristics as follows:

easy assembly during the integration of the sub-munitions;
a smaller volume;
easy checking of the locked or unlocked state permitting its use for a safety function;
operation that is perfectly symmetrical with the axis of the sub-munitions supposed to be oriented along the speed vector, compatible with a gradual removal of the parachute designed to reduce the opening disturbances.

These requirements are met in providing, in the first element on which the second element to be locked is mounted:

a peripheral housing opened outwards;
a circlip engaged in said housing, the ends of which are spread out in the resting position, said circlip having, on its external rim, teeth capable of getting engaged in retaining means provided in the wall of said second element, and
a means to bring the ends of the circlip closer together in order to retract it and make the teeth of said retaining means come out, the means to bring the ends of the circlip closer together being controlled by a delaying means;

According to another characteristic of the invention, said delaying means is an electronic means.

According to another characteristic of the invention, said peripheral housing is a groove.

According to another characteristic of the invention, said retaining means in the wall of the parachute container are holes in correspondence with said teeth.

According to another characteristic of the invention, said means for bringing the ends of the circlip closer together is formed by two link-rods capable of pivoting, substantially at their midpoint, parallel to the plane of the circlip, one end of each link-rod being hinged on a corresponding end of said circlip, and a means for spreading apart the other two ends of the rods being provided, controlled by said delaying means.

According to another characteristic of the invention, said spreading-apart means is a slider actuated by the rod of a pyrotechnical piston.

BRIEF DESCRIPTION OF THE DRAWINGS

The above-mentioned characteristics of the invention, as well as others, will appear more clearly from the following description of an embodiment, made in relation to the appended drawings, of which.

DETAILED DESCRIPTION OF THE PREFERRED EMBODIMENTS

Figure 3:
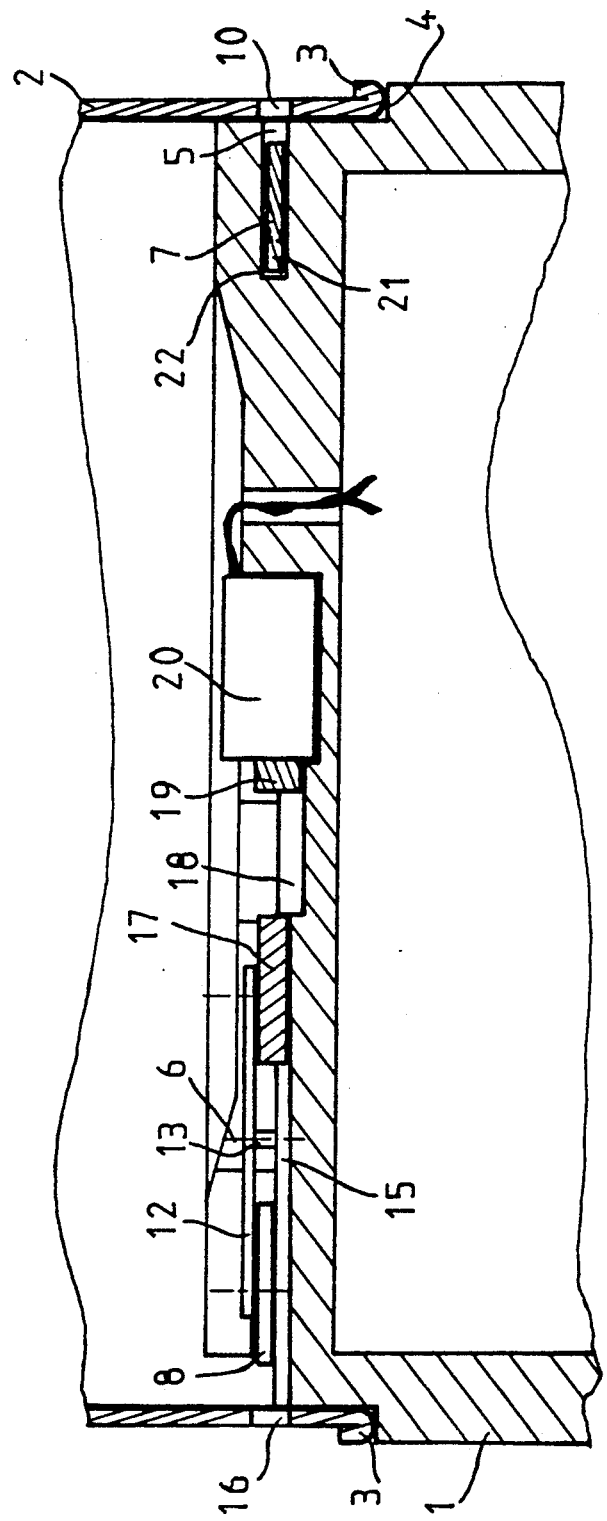
FIG. 3 is a partial view, in vertical section, along the line III—III of FIG. 1.

FIG. 3 shows a sectional view of the upper part of a structure 1 which, as a rule, is fixedly joined to a sub-munition. This structure 1 is capped by the lower part of a parachute container 2 with a folded-in edge 3. A shoulder 4 on the external face of the structure 1 enables a precise positioning of the container 2.

Above the shoulder 4, the structure 1 has a peripheral groove 5 which opens outwards. The groove 5 is interrupted by a hollow part with radial symmetry 6 in the upper face of the structure 1. In the groove 5, there is housed a circlip 7, the ends of which form two lugs 8 with a distance between them, pointed inwards and contained in the hollow part 6. On its external rim, the circlip 7 has evenly spaced out teeth 9 pointed outwards. The groove 5 is deep enough for the circlip 7 with its teeth 9 to be capable of entering therein completely when it is tightened. On the other hand, when the circlip is in its initial state, or deployed state, its teeth 9 are outside the groove 5. When a parachute container 2 is fixed on the structure 1, then the teeth 9 are engaged in corresponding holes 10 provided in the lower part of the container 2 (FIG. 2). To give a clear view of said holes 10 in FIGS. 1 and 2, the parachute container 2 is shown as being sectioned at their level.

Each lug 8 of the circlip 7 has an elongated hole 11 with a substantially radial direction, through which it is hinged with an end of a link-rod 12. The link-rods 12 are mounted so as to be pivoting, substantially in their median part, around axes 13 perpendicular to the plane of the circlip 7. The other ends of the link-rods 12 have rollers 14, substantially in the plane of the circlip 7. The presence of the rollers 14 is not strictly necessary for the operation but, through a reduction in friction, they enable a reduction to be obtained in the energy needed to actuate the device.

Between the link-rods 12, the bottom of the hollow part 6 has a radial channel 15, the external end of which communicates with a hole 16 in the lower part of the parachute container 2. Towards the interior, the channel 15 widens out on either side before the rollers 14 and, thus enlarged, it extends beyond said rollers.

In the widened part of the channel 15, a slider 17 is engaged. This slider 17 may or may not be between the rollers 14, depending on its position in the groove. The slider 17 has its end pointed outwards in the form of a tapering tip so that it can get engaged between the rollers 14 when these rollers are close to each other as in FIG. 2.

The bottom of the channel 15, in the rear part of this groove, has a second narrow channel 18, in which the rod 19 of pyrotechnical piston 20 is engaged. The rod 19 extends beyond the channel 18 so as to be capable of pushing the slider 17 outwards. The pyrotechnical piston is actuated by an electronic means (not shown).

The elements of the device of the invention contained in the hollow part 6 are covered by a shielding and retaining element, which is also not shown. In practice, said shielding and retaining element may be a metal sheet fixed by self-cutting screws to the structure 1. It will be noted that this metal sheet may form the upper wall of the peripheral groove 5. Under these conditions, the structure 1 may be obtained directly by molding or swaging without remachining work.

Figure 1:
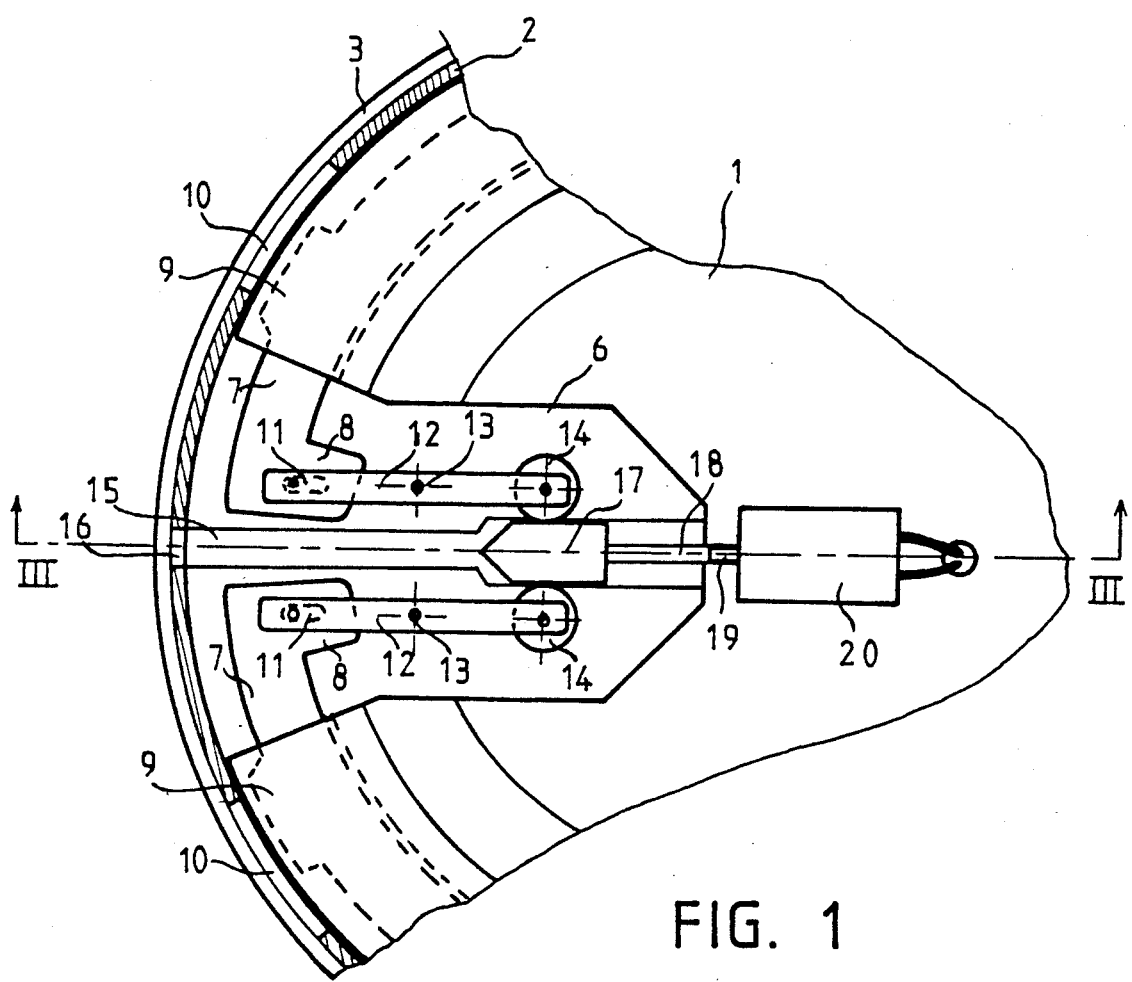
FIG. 1 is a schematic partial top view showing the device of the invention in an unlocked position.
Figure 2:
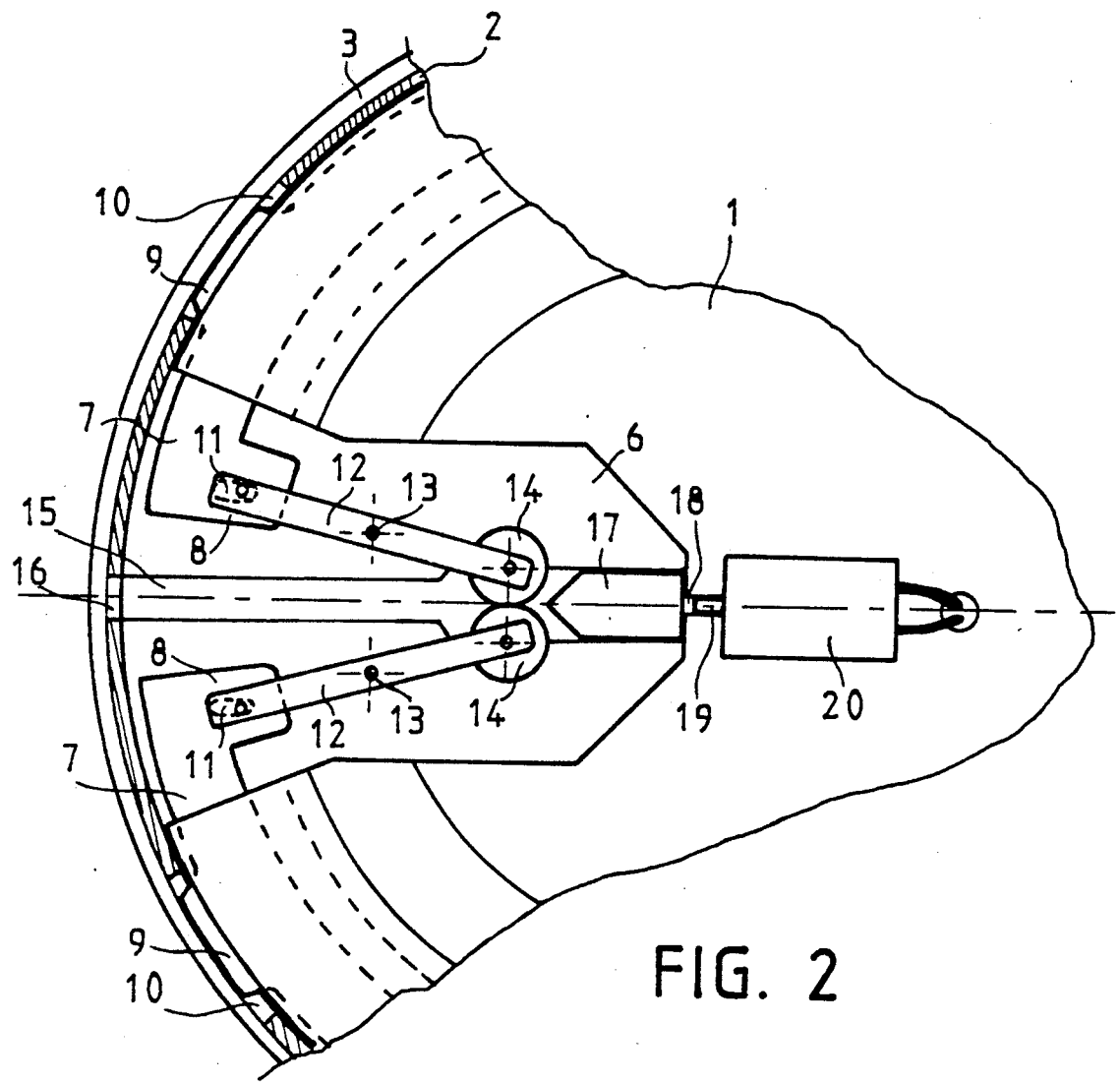
FIG. 2 is a view similar to that of FIG. 1, showing the device in a locked position.

To place the parachute container 2 on the structure 1, the device is placed in the state of FIG. 1. For this purpose, it suffices to place the slider 17 between the rollers 14. The ends of the circlip 7 are thus brought closer together, so that it is entirely contained, with its teeth 9, in the groove 5. The container 2 can then be placed on the structure 1, in making it abut the shoulder 4. Preferably, a marker or guiding means is provided to facilitate the angular positioning of the holes 10. Once the container 2 is thus placed on the structure 1, the tip of a tool is engaged in the hole 16 to push the slider 17 back inwards, beyond the rollers 14. The ends of the circlip 7 are thus released so that, by elasticity, they resume their initial deployed form, and so that the teeth 9 get engaged in the holes 10 of the container 2, locking it to the structure 1.

The unlocking is done by switching on the power to the pyrotechnical piston 20. The rod 19 of this pyrotechnical piston 20 pushes the slider outwards, between the rollers 14. This brings the ends of the circlip 7 closer together and retracts the teeth 9 which come out of the lights 10. It must be noted that the narrowing of the channel 15 forms a stop to the slider 17 which, when pushed by the rod 19, is thus forced to remain between the rollers 14.

Opposite the locking mechanism, the circlip 7 may comprise a tooth 21 (FIG. 3), pointed inwards and designed to be received in a notch 22 of the structure 1. The engaging of the tooth 21 in the notch 22 forces the circlip to work symmetrically, in order to avert any possibility of jamming.

The device of the invention has many advantages, notably the advantages wherein it can be integrated into the structure 1 and wherein it can be designed to be made of swaged sheet metal. Furthermore, the integration into the structure 1 is done on an as-molded part. Hence, the entire unit can be made economically. Furthermore, it is very easy to check the locking: it is enough to see whether the teeth are engaged in the holes of the parachute container.

The device of the invention can be applied to whenever there is a need for the provoked separation of two elements of a projectile.

What is claimed is:

1. A device for the locking and unlocking of first and second elements of a projectile, said device being provided in said first element, said second element, which is to be locked thereto being mounted on said first element, comprising:
   a peripheral housing opened outwards;
   a circlip engaged in said housing, the ends of which are spread out int he resting position, said circlip having, on its external rim, teeth for engaging a retaining means provided in the wall of said second element,
   a means to bring the ends of the circlip closer together in order to retract it and disengage said teeth from said retaining means; and
   delaying means for actuating said means to bring the ends of the circlip closer together.

2. A device according to claim 1, wherein said delaying means is an electronic means.

3. A device according to claim 1 or 2, wherein said peripheral housing includes a circumferential groove.

4. A device according to claim 1, wherein said retaining means in the wall of the second element are a plurality of holes which are in alignment with said teeth.

5. A device according to claim 1, wherein said means for bringing the ends of the circlip closer together is formed by two link-rods pivotally mounted, substantially at their midpoint, parallel to the plane of the circlip, one end of each link-rod being hinged on a corresponding end of said circlip, and a means for spreading apart the other two ends of the rods being controlled by said delaying means.

6. A device according to claim 1, wherein said spreading-apart means is a slider actuated by the rod of a pyrotechnical piston.

7. A device according to claim 1, wherein the circlip comprises, opposite the locking mechanism, a tooth pointed inwards, for receipt in a notch of the structure.

8. A device according to claim 1, wherein said second element is a parachute container.

* * * * *